(12) United States Patent
Johansson

(10) Patent No.: US 8,763,984 B2
(45) Date of Patent: Jul. 1, 2014

(54) ELECTROMECHANICAL VLAVE

(75) Inventor: Per-Ove Johansson, Trånsgund (SE)

(73) Assignee: SO Elektronik AB, Haninge (SE)

( * ) Notice: Subject to any disclaimer, the term of this patent is extended or adjusted under 35 U.S.C. 154(b) by 265 days.

(21) Appl. No.: 12/663,280

(22) PCT Filed: May 21, 2008

(86) PCT No.: PCT/SE2008/000343
§ 371 (c)(1),
(2), (4) Date: Dec. 6, 2009

(87) PCT Pub. No.: WO2008/156405
PCT Pub. Date: Dec. 24, 2008

(65) Prior Publication Data
US 2010/0163768 A1    Jul. 1, 2010

(30) Foreign Application Priority Data

Jun. 20, 2007 (SE) .................................. 0701504-3
Apr. 29, 2008 (SE) .................................. 0800966-4

(51) Int. Cl.
*F16K 31/02* (2006.01)
(52) U.S. Cl.
USPC ................................ 251/129.16; 251/129.17
(58) Field of Classification Search
USPC ..................................... 251/129.16, 129.17
See application file for complete search history.

(56) References Cited

U.S. PATENT DOCUMENTS

| | | | | |
|---|---|---|---|---|
| 2,911,183 A | * | 11/1959 | Matthews et al. | 251/129.02 |
| 3,921,670 A | * | 11/1975 | Clippard et al. | 137/625.65 |
| 4,076,045 A | * | 2/1978 | Nakajima et al. | 137/625.65 |
| 4,196,751 A | * | 4/1980 | Fischer et al. | 137/625.65 |
| 4,336,823 A | * | 6/1982 | Staiger et al. | 137/270 |
| 5,474,100 A | * | 12/1995 | Nishijima et al. | 137/82 |
| 5,593,134 A | * | 1/1997 | Steber et al. | 251/129.17 |
| 5,628,491 A | * | 5/1997 | Krone | 251/129.21 |
| 6,220,569 B1 | | 4/2001 | Kelly | |
| 6,550,745 B2 | * | 4/2003 | Bergstrom et al. | 251/129.16 |
| 6,737,946 B2 | * | 5/2004 | Seale et al. | 335/279 |
| 7,249,749 B2 | * | 7/2007 | Niwa et al. | 251/129.16 |

FOREIGN PATENT DOCUMENTS

GB      1164043 A      9/1969

OTHER PUBLICATIONS

Swedish Patent Office, Int'l Search Report in PCT/SE2008/000343, Aug. 28, 2008.

* cited by examiner

*Primary Examiner* — John K Fristoe, Jr.
*Assistant Examiner* — Matthew W Jellett
(74) *Attorney, Agent, or Firm* — Piedmont Intellectual Property

(57) ABSTRACT

An electromechanical valve (1) comprises in a housing (2), a core (3) of magnetic material surrounded by a coil (5) to be supplied with excitation current, a valve seat (6) attached to the housing (2) with a space to said core (3), at least one centrally located outlet port (7) in said valve seat (6) and at least one inlet port (8) communicating via said space, and a valve washer (9) of magnetic material suspended in said to close said outlet port (7) in absence of excitation current to said coil (5), said valve washer (9) cooperating with said core (3) to open said outlet port (7) when excitation current is supplied to said coil (5).

12 Claims, 3 Drawing Sheets

ELECTROMECHANICAL VLAVE

TECHNICAL FIELD

The invention relates generally to valves and more specifically to an electromechanical valve.

BACKGROUND OF THE INVENTION

Among disadvantages with today's electromechanical valves are low flow capacity, long response times, wearing, sticking and leakage. Hence there exists a need for an improved electromagnetic valve.

SUMMARY OF THE INVENTION

The object of the invention is to overcome the disadvantages with today's electromechanical valves and to provide an improved electromagnetic valve.

This object and other are attained by the electromechanical valve according to the present invention as set out in the appended claims.

In accordance with one embodiment the electromagnetic valve comprises a housing, a cup-shaped body of magnetic material having a centrally extending core surrounded by a coil to be supplied with excitation current, a valve seat attached to the housing with a space to said core, at least one centrally located outlet port in said valve seat and at least one inlet port communicating with said space, and a valve washer of magnetic material suspended in said space to close said outlet port in absence of excitation current to said coil, said valve washer cooperating with said core to control the outlet port in response to an excitation current supplied to said coil.

In accordance with one embodiment the valve washer is formed by a multitude of layers adapted to generate a spring force when compressed. In particular the valve washer can be a washer of blade spring type formed by an electro magnetic material.

In one embodiment the core extends to the rim of the cup-shaped body.

In one embodiment said at least one inlet port is located radially from said at least one outlet port in said valve seat.

In one embodiment said at least two spring ribs extend radially from said valve washer.

In one embodiment said valve washer has a stroke ≤2 mm in said space.

In one embodiment said coil has low inductance.

In one embodiment said coil is to be supplied with excitation current from a current source having current generator characteristic.

The electronic valve in accordance with the present invention will provide a robust electromagnetic valve that can be controlled with short opening and closing time thereby enabling an accurate control of flow and pressure.

BRIEF DESCRIPTION OF THE DRAWINGS

The invention will now be described in more detail by means of non-limiting examples and with reference to the accompanying drawings, in which.

DESCRIPTION OF THE INVENTION

Figure 1:
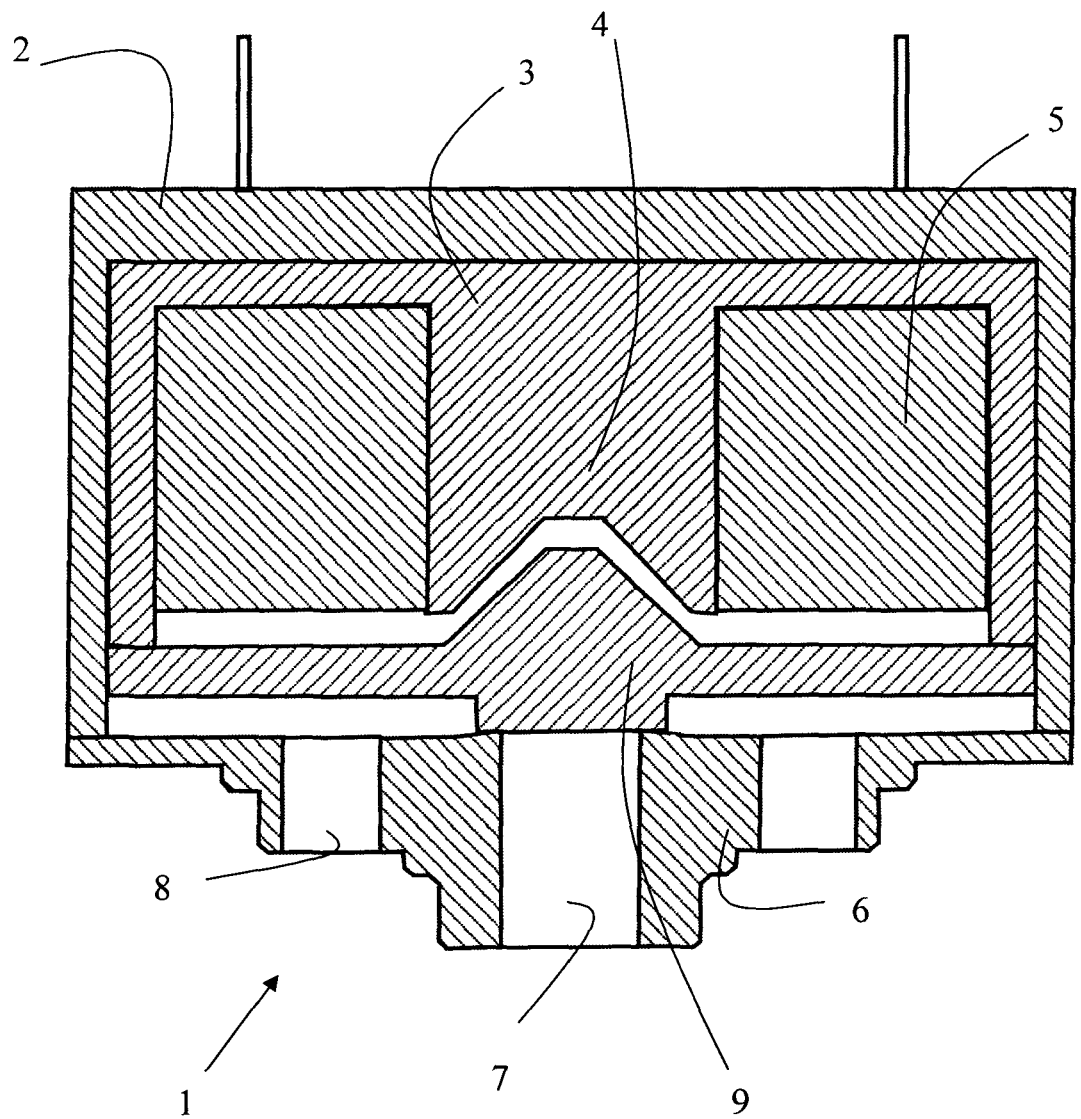
FIG. 1 is an axial section of an embodiment of an electromechanical valve according to the invention.

In FIG. 1, an axial section of an embodiment of an electromechanical valve 1, e.g. a pneumatic valve, according to the invention is shown.

The valve 1 comprises in a housing 2 of non-magnetic material, e.g. aluminium. Inside the housing 2 a core 3 of an electromagnetic material is located. The core 3 has a centrally extending portion 4 that is surrounded by a coil 5. In one embodiment the core 3 is generally cup-shaped. In one embodiment the core 3 can be E-shaped.

In one embodiment, the centrally located portion 4 extends to the rim of the cup shaped electromagnetic core 3. It is however to be understood that the portion 4 may be shorter or longer than the height of the wall of the core.

The coil 5 is supplied with excitation current from a current source such as the one described below in conjunction with FIG. 3 via its terminals.

Preferably, the coil 5 has low inductance and the current source to be connected to the terminals has current generator characteristic.

A valve seat 6, also of non-magnetic material, e.g. aluminium, is attached, e.g. by means of screws (not shown), to the housing 2 with a space to the core 3.

The valve 1 further has an outlet port 7. In one embodiment, the valve seat 6 has a centrally located outlet port 7. In accordance with another embodiment more than one outlet port 7 is provided.

The valve 1 further comprises an inlet port 8. In accordance with one embodiment the valve 1 comprises two inlet ports 8 at a radial distance from the outlet port 7. The number of inlet ports can vary for different applications. At least one inlet port 8 is provided and more may be used.

The outlet port 7 and the inlet ports 8 are in communication via a space between the valve seat 6 and the core 3.

It is to be understood that the location of the inlet ports 8 is not restricted but that the location of the inlet ports 8 can depend on the intended use of valve 1 and can hence be located at any suitable location depending on the field of use of the valve 1.

In accordance with the invention, a valve washer 9 of magnetic material is resiliently suspended in space between the valve seat 6 and the core 3.

In accordance with one embodiment the washer 9 is suspended by spring ribs extending from the valve washer 9 to keep the outlet port 7 closed in absence of excitation current to coil 5.

Figure 2:
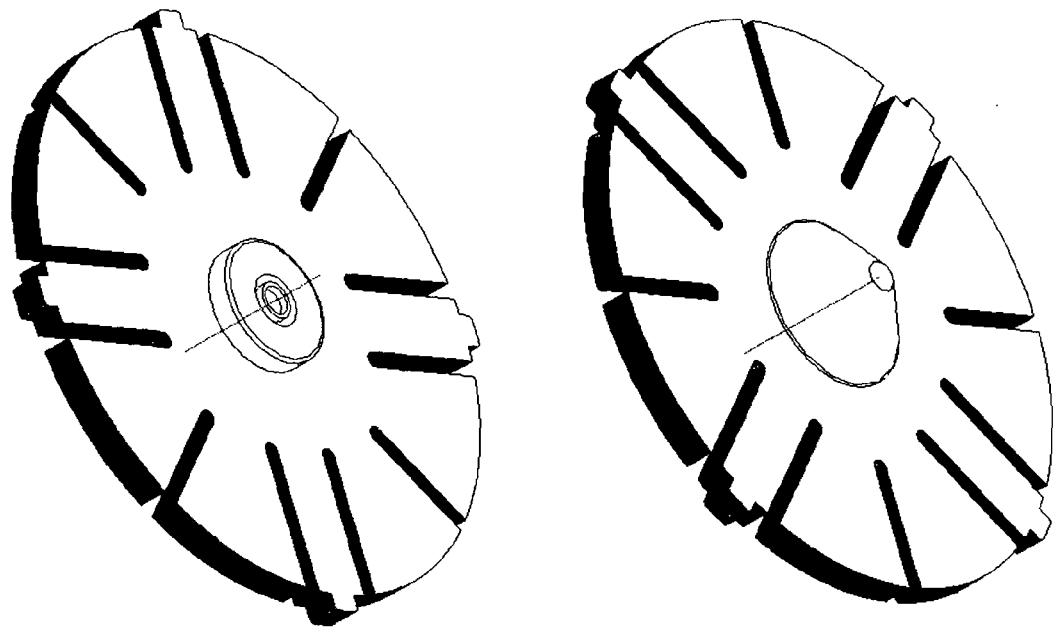
FIG. 2 is a perspective view of an embodiment of a valve washer.
Figure 2A:
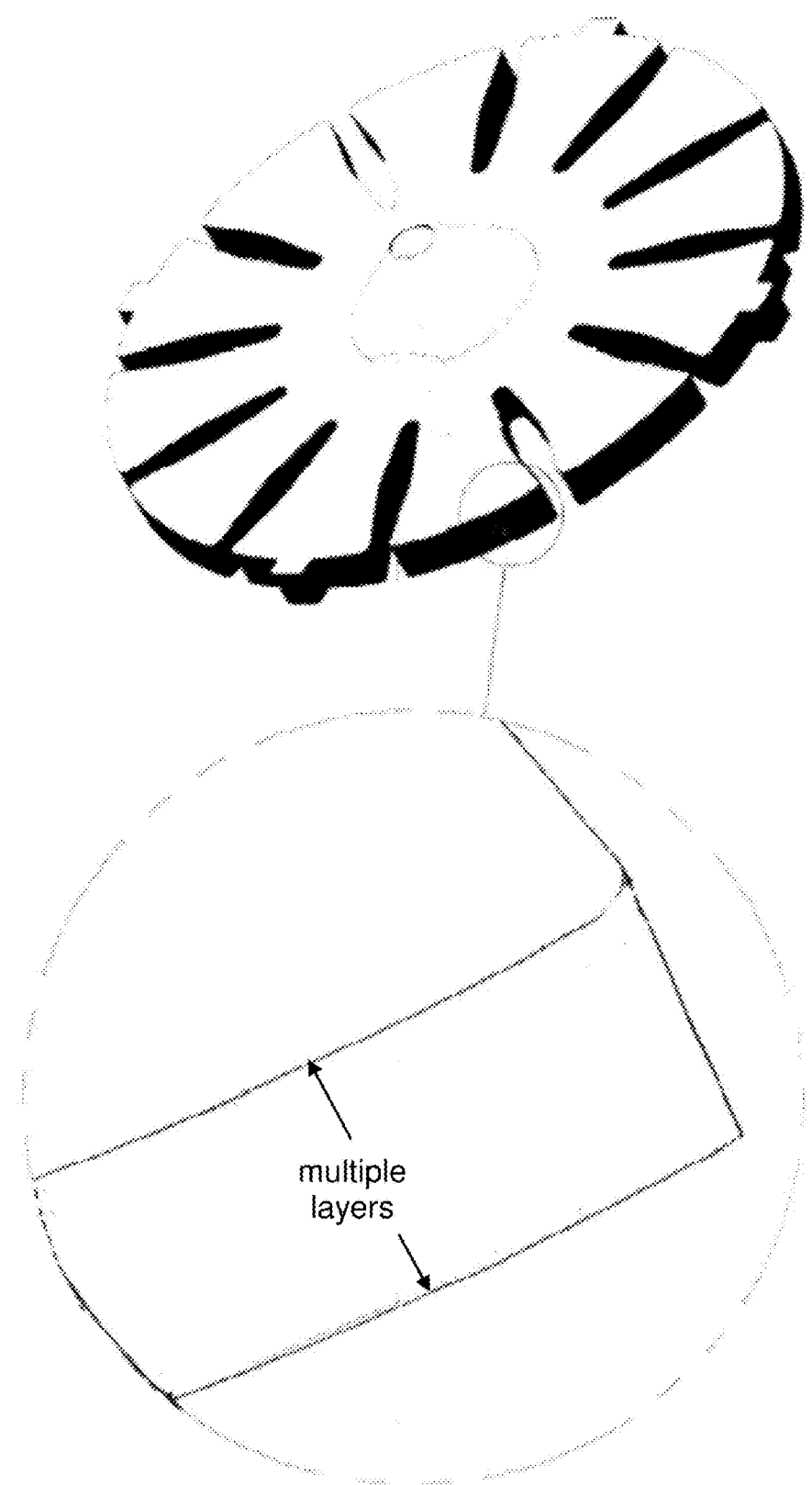
FIG. 2A shows an embodiment of a valve washer formed by multiple layers.

In accordance with one embodiment shown in FIG. 2A the washer 9 is formed by multiple layers of an electromagnetic material forming a blade spring whereby the washer does not need to be suspended but can provide the required spring force in it self.

When excitation current is supplied to the coil 5, the valve washer 9 cooperates with, i.e. is attracted by, core 3 to open the outlet port 7, i.e. normally closed. In another embodiment the electromagnetic valve is operative to be open absent an excitation current, i.e. normally open, and closed when excitation current is supplied to the coil 5. Hence, the flow in the electromagnetic coil is controlled by the current supplied to the coil.

The valve washer 9 preferably, has a stroke ≤2 mm to keep dimension down.

In FIG. 2 a perspective view from both sides of an embodiment of a valve washer 9 formed by multiple layers of an electromagnetic material is shown. The layers form a blade spring washer that enables the washer to return to its seat when not excited by any electricity.

Figure 3:
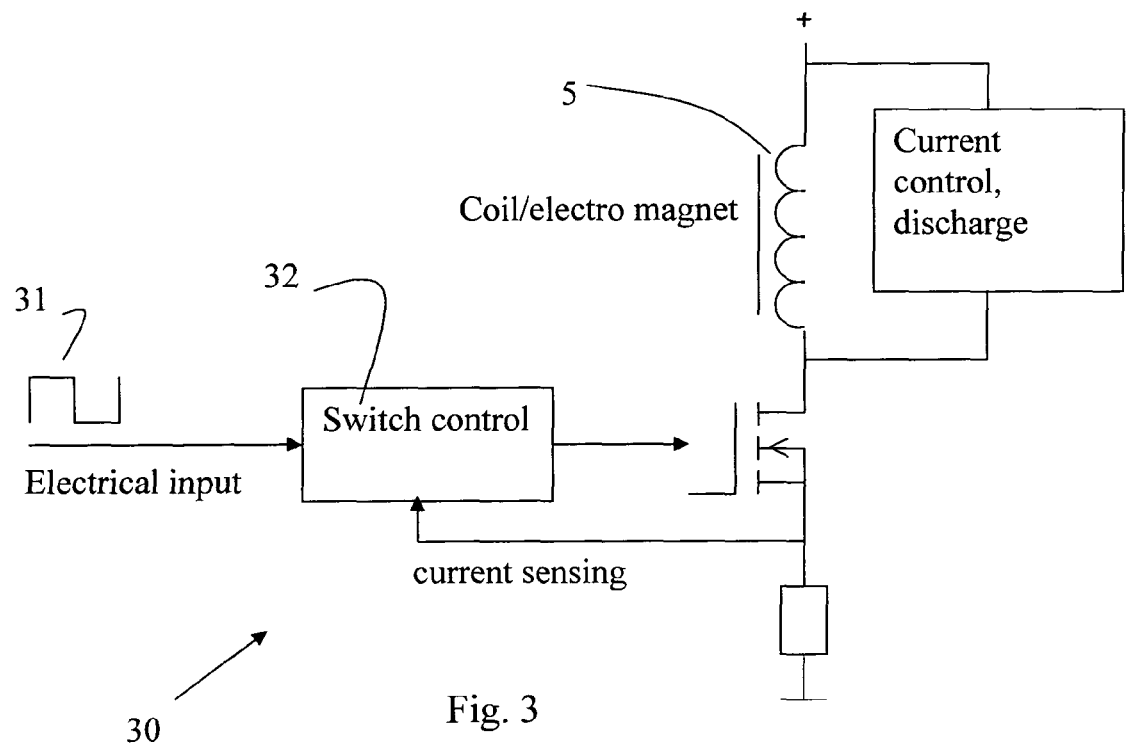
FIG. 3 is a view of a drive circuit for driving an electromagnetic valve.

In FIG. 3 a drive circuit 30 for providing an efficient drive current for driving the valve 1 is shown. The drive circuit 30 comprises an input terminal 31 supplying an input signal.

The drive circuit 30 provides a drive current for driving the electromagnetic coil 4. In one embodiment the drive current is provided by a switched current controlled by a control circuit 32 for opening and closing the valve 1. By controlling the switching times the valve 1 can be controlled to let through an appropriate amount of flow. The switching can preferably be performed by current sensing switching. The drive circuit hereby can act as a current generator providing a pulse width modulated drive current.

It is advantageous for some applications if the response time for the electromagnetic valve can be made short. This is because a short response time allows for a high switching frequency, a higher resolution and an expanded operational range for the flow, which is desired in many applications. In order to achieve a short response time the core 3 can in accordance with one embodiment by made of a magnetic material with a short response time reducing the presence of eddy currents. This can be achieved by manufacturing the core by plates made of an electromagnetic material in multiple layers or using other materials having a short response time such as Somaloy. Also the resistance of the magnetic material can be made high so that the electric conductivity is made low.

The invention claimed is:

1. An electromechanical valve, comprising:
   a housing, wherein the housing includes:
   a core of magnetic material having a centrally extending portion surrounded by a coil to be supplied with an excitation current;
   a valve seat attached to the housing with a space to the core;
   at least one centrally located outlet port in the valve seat and at least one inlet port communicating through the space; and
   a valve washer of magnetic material suspended in the space to close the outlet port in absence of the excitation current to the coil, the valve washer cooperating with the core to control the outlet port in response to the excitation current and being suspended by radially extending spring ribs separated by respective radial slits;
   wherein the valve washer comprises multiple layers of electromagnetic material providing a spring force when the valve washer is compressed, the multiple layers of electromagnetic material have substantially the same physical dimensions, the valve washer has a stroke less than two millimeters in the space, and the multiple layers form a blade spring, whereby the valve washer provides a required spring force by itself and is uncambered.

2. The valve of claim 1, wherein the valve washer is resiliently suspended in the space between the valve seat and the core.

3. The valve of claim 2, wherein the core is cup shaped with a centrally extending portion to a rim of the cup-shaped core.

4. The valve of claim 2, wherein the at least one inlet port is located radially from the at least one outlet port in the valve seat.

5. The valve of claim 2, wherein the valve washer has a stroke less than two millimeters in the space.

6. The valve of claim 2, wherein the core is an electromagnetic material having a short response time.

7. The valve of claim 1, wherein the core is cup shaped with a centrally extending portion to a rim of the cup-shaped core.

8. The valve of claim 1, wherein the at least one inlet port is located radially from the at least one outlet port in the valve seat.

9. The valve of claim 1, wherein the valve washer has a stroke less than two millimeters in the space, and radially extending spring ribs include tabs on their outer edges.

10. The valve of claim 1, wherein the core is an electromagnetic material having a short response time.

11. The valve of claim 1, wherein the outlet port is normally closed.

12. The valve of claim 1, further comprising a drive circuit coupled to the coil and configured for providing a pulse-width-modulated excitation current.

* * * * *